Figure 9:
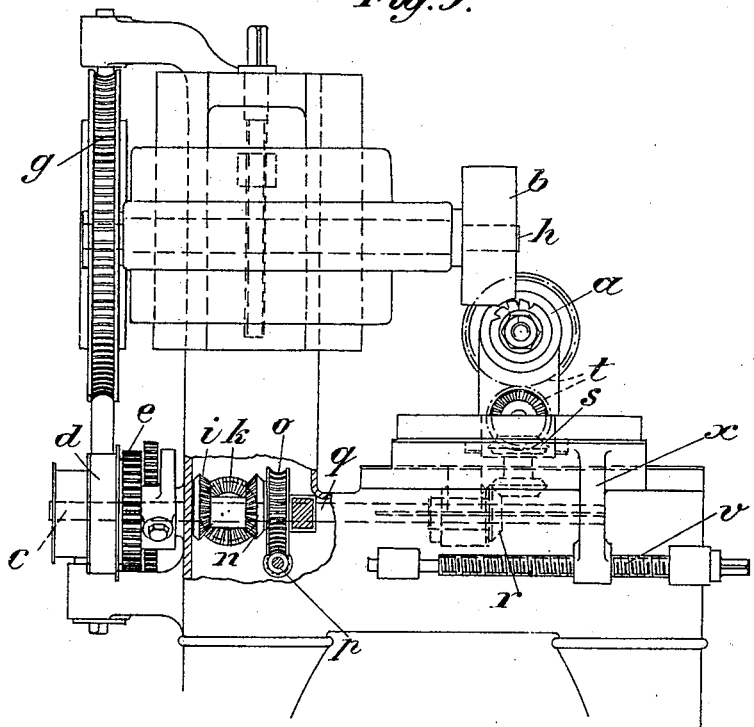

No. 640,728. Patented Jan. 2, 1900.
R. H. PFAUTER.
APPARATUS FOR CUTTING WORM WHEELS.
(Application filed Aug. 10, 1899.)
(No Model.) 3 Sheets—Sheet 1.
Fig. 1.
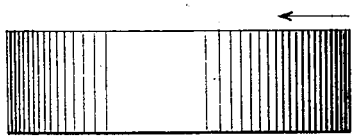
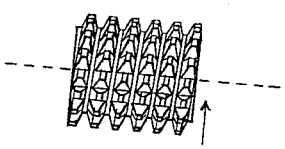
Fig. 2.
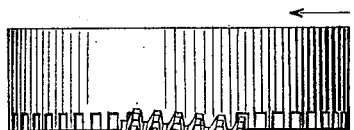
Fig. 3.
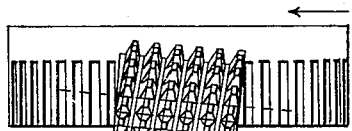
Fig. 4.
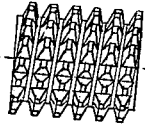
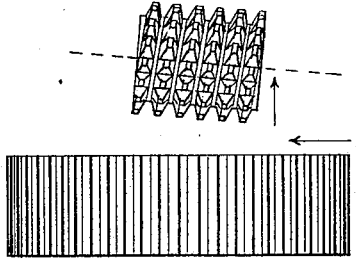
Fig. 5.
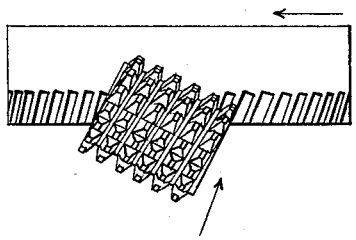
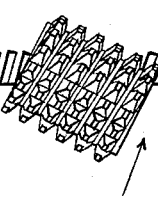
Witnesses
F. H. Schott
Anton Albetzner
Inventor
Robert H. Pfauter
by Max Thugil
Attorney No. 640,728. Patented Jan. 2, 1900.
R. H. PFAUTER.
APPARATUS FOR CUTTING WORM WHEELS.
(Application filed Aug. 10, 1899.)
(No Model.) 3 Sheets—Sheet 2.
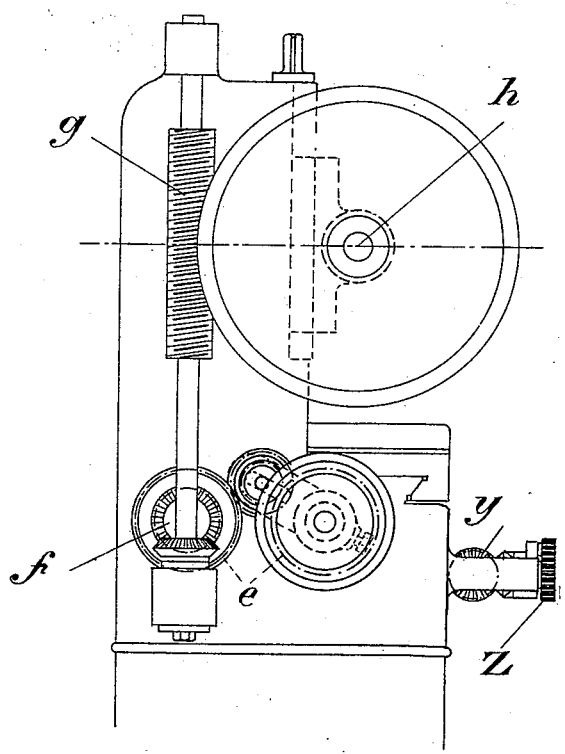
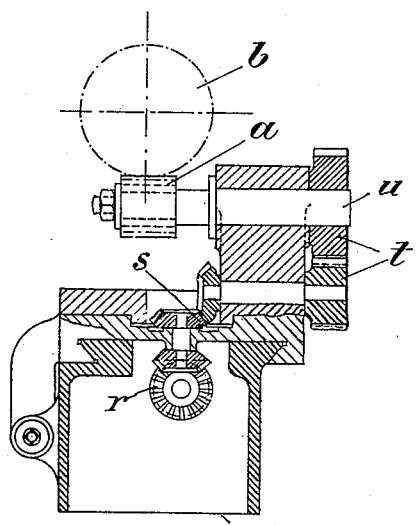
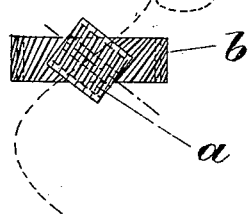
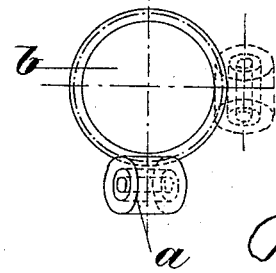
Witnesses:
Anton A. Gloekner
N. Mitchell
Inventor:
Robert Hermann Pfauter
by Maj. H. Ingu
Attorney
THE NORRIS PETERS CO., PHOTO-LITHO., WASHINGTON, D. C.

No. 640,728. Patented Jan. 2, 1900.
R. H. PFAUTER.
APPARATUS FOR CUTTING WORM WHEELS.
(Application filed Aug. 10, 1899.)

(No Model.) 3 Sheets—Sheet 3.

Witnesses:
Anton A. Gloezner
N. Mitchell

Inventor,
Robert Hermann Pfauter
by Max H. Ingli
Attorney

THE NORRIS PETERS CO., PHOTO-LITHO., WASHINGTON, D. C.

UNITED STATES PATENT OFFICE.

ROBERT HERMANN PFAUTER, OF CHEMNITZ, GERMANY, ASSIGNOR TO THE CHEMNITZER STRICKMASCHINEN FABRIK, OF SAME PLACE.

APPARATUS FOR CUTTING WORM-WHEELS.

SPECIFICATION forming part of Letters Patent No. 640,728, dated January 2, 1900.

Application filed August 10, 1899. Serial No. 726,770. (No model.)

*To all whom it may concern:*

Be it known that I, ROBERT HERMANN PFAUTER, engineer, a subject of the King of Saxony, residing at No. 147 Zschopauerstrasse, Chemnitz, in the Kingdom of Saxony, German Empire, have invented a new and useful Method of and Apparatus for Cutting Worm-Wheels, of which the following is an exact specification.

This invention relates to means for cutting spiral worm-wheels; and it consists, substantially, in such features of improvement as will hereinafter be more particularly described.

In order that my invention may be more fully understood, I shall first describe one of the usual ways in which the cutting of an ordinary spur-wheel is effected by means of a single-thread spiral cutter, viz:

In cutting the teeth of a spur-wheel by means of a single-thread spiral cutter the latter is made to perform as many revolutions during one revolution of the spur-wheel blank as teeth have to be cut on the latter. The axis of the cutter being situated at an angle to the plane of the wheel to be cut corresponding to the pitch of the spiral cutter, the latter is advanced in a direction parallel to the axis of the wheel, whereupon it will begin to cut some of the teeth on the latter, and, in revolving at the same time that the wheel-blank is rotated, it will by degrees cut the commencement of all the teeth on the latter. On then gradually advancing the spiral cutter in the same direction it will gradually cut the teeth across the whole width of the wheel-periphery in a direction parallel with the axis of the wheel, as is required for spur-wheels.

In order to make my invention more clear, I refer to the accompanying drawings, in which similar letters denote similar parts throughout the different views, and in which—

Figures 1 to 4, inclusive, are diagrammatical views illustrating the several steps resorted to with apparatus for cutting spur-wheels, as above described. Fig. 1 shows the angular position of the spiral cutter before commencement of the work. Fig. 2 shows its position after the wheel-blank has completed one revolution. Fig. 3 shows the position after about one-half the width of the teeth have been cut by a corresponding number of revolutions of the wheel-blank, and Fig. 4 shows the finished spur-wheel with the spiral cutter moved beyond it.

The present invention for cutting spiral worm-wheels is distinguished from that above described mainly in that the advance of the spiral cutter does not take effect in a rectilinear direction, but in a helical direction relatively to the axis of the wheel-blank, as shown at Figs. 6 and 7, and with a differential resultant motion between the two. A direct movement of the spiral cutter in this direction leads to practical difficulties; but indirectly it can readily be obtained as the resultant of a rectilinear forward motion (as with the spur-wheel cutter) and a lead in the advance of either the cutter or the wheel-blank during the rotation. Thus according to the present invention a spiral worm-wheel is produced in such manner that the number of revolutions of the spiral cutter which are necessary for cutting the complete teeth of a spur-wheel as above described has to be increased—for example, by one revolution—while the number of revolutions of the wheel-blank remains the same as before. This one additional revolution of the cutter taken in connection with its advancing motion gives as resultant the helical direction required for the teeth of the spiral worm-wheel. This action is indicated at Fig. 5. It will be evident that by a reversal of the action the helical motion can be imparted to the wheel-blank, or the two separate motions performed only by the cutter, as above described, can also both be performed by the wheel-blank, or the one motion can be effected by the cutter (either the forward motion or the additional rotation) and the other by the wheel-blank, for in all these cases the same end result will be obtained—namely, the relative change of position between the cutter and the wheel-blank which has to be effected for producing helically-formed teeth.

In the above description it has been assumed for the sake of simplicity that the number of revolutions of the spiral cutter relatively to a certain number of revolutions of the wheel-blank have to be increased, for example, by one revolution. It will be evident, however, that any other proportional increase of the number of revolutions can be employed—such, for instance, as two, three, or more additional revolutions or a fraction of a revolution, or one or more and a fraction, &c.—accordingly as a greater or smaller pitch of the spiral teeth may be required. The number of revolutions of the worm-cutter could also be reduced by one or more revolutions or fractions thereof, as above stated, instead of being increased, whereby helical teeth of the opposite pitch would be produced with an opposite inclination of the axis of the spiral cutter. Also, instead of a single-thread spiral cutter cutters with two or more threads may be used in the above-described manner. In this case the number of revolutions of the cutter would be decreased in proportion to the number of its threads, as at each revolution of the wheel-blank two, three, or more teeth will be cut simultaneously.

In the above-described manner spiral worm-wheels can be cut by one and the same spiral cutter having a pitch varying from zero to one hundred and eighty degrees, accordingly as the cutter has one or more additional or one or more less revolutions imparted to it. At the limits zero and one hundred and eighty degrees the spiral worm-wheel of course reverts to the ordinary worm, and at ninety degrees the cutter forms spur-wheels. In all cases the spiral cutter must of course have the corresponding greater or less inclination to the axis of the worm-wheel blank, so that the direction of pitch of the cutter-teeth always coincides with the direction of inclination of the teeth-spaces.

Figs. 8 to 11 of the drawings show a machine by means of which the above-described method can be carried out in the case in which the relative motion of the spiral cutter to that of the wheel-blank in a helical path around the latter is effected by an axial advancing motion and the above-described increase or decrease of the number of revolutions of the cutter.

Figure 10:
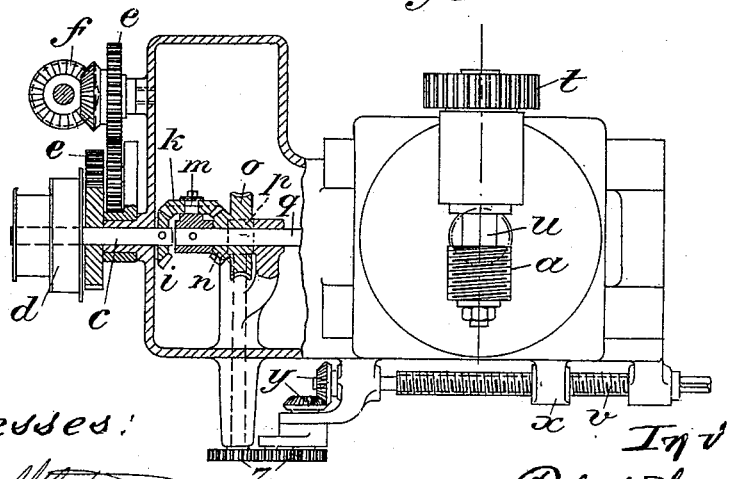

The spiral cutter is designated by $a$ and the wheel-blank to be provided with helical teeth by $b$. Both are made to rotate on their axes as ordinary worm and worm-wheel gear with a prescribed motion, according to the ratio between the number of threads of the cutter and number of teeth of the wheel, this motion being effected by means of intermediate gear. The rotation of the wheel-blank $b$ and worm-cutter $a$ is effected from a shaft $c$ with stepped belt-pulleys $d$. In the arrangement shown the rotation of the wheel-blank $b$ is obtained through the train of wheels $e$, beveled wheels $f$, and worm and worm-wheel gear $g$, driving the shaft $h$, on which the wheel-blank is situated, as shown at Figs. 9, 10, and 11, while the rotation of the spiral cutter is obtained through intermediate gear, which produces a rectilinear advance of the cutter toward the wheel-blank and the requisite acceleration or retardation of the revolutions thereof relatively to the revolutions of the wheel-blank. In addition the cutter is so arranged that its axis can be adjusted in any angular direction relatively to the axis of the wheel-blank, as at Figs. 8, 9, 10, and 11.

The intermediate mechanism employed in the arrangement shown for effecting the above-described relative motion of the spiral cutter $a$ is as follows: The rotary motion transmitted from the driving-shaft $c$ to the cutter is effected by means of a train of differential gear $i$ $k$ $n$, which transmits the rotation of shaft $c$ to shaft $q$ and from this by means of the beveled gear $r$ and $s$ and spur-wheels $t$ to the cutter-shaft $u$. The gear $i$ $k$ $n$ is so arranged that the wheel $i$ is fixed on shaft $o$, while wheel $k$ revolves loose on a pin $m$, projecting at right angles from the shaft $q$. The pinion $n$ is fixed to a worm-wheel $o$, both being mounted loose on the shaft $q$.

The worm-wheel $o$ can have a special rotation imparted to it through a worm $p$ and spur-wheels $z$, as also beveled wheels $y$, from a spindle $v$. This special rotation effects the acceleration of the rotary motion of the cutter relatively to the wheel-blank. The spindle $v$ is constructed as a screw-spindle, the screw-thread of which serves to shift the slide carrying the cutter in the direction of the shaft $h$, carrying the wheel-blank $b$, for which purpose the arm $x$ of the slide is formed to serve as nut for the spindle. This shifting motion effects the rectilinear motion of the cutter toward the wheel-blank.

The cutter $a$, together with its support and the driving-gear $t$, is mounted on a disk W, rotatable around a vertical axis, the said axis serving at the same time as the shaft for the horizontal bevel-wheel $s$, so that the rotation of the cutter can be effected from the shaft $q$ in every position into which the disk or the cutter may be adjusted relatively to the wheel-blank for cutting helical teeth thereon at a greater or less pitch.

The working operation in cutting helical teeth is as follows: If a wheel-blank is to have helical teeth cut thereon by means of a single-thread spiral cutter, the latter must have a certain increased or decreased number of rotations imparted to it relatively to the number of teeth to be formed on the wheel. For this purpose the shaft $q$ has an accelerated or retarded motion imparted to it proportionate to the pitch of the helical line of the teeth to be cut by means of a corresponding rotation of the worm-wheel $o$, actuated by the spur-gear $z$, bevel-gear $y$, and spindle $v$. Assuming, for instance, that a single-thread cutter with a pitch of twenty millimeters, a screw-spindle $v$ with five millimeters' pitch, and a wheel-blank of a width of twenty millimeters be employed, on which latter thirty teeth with a pitch of forty-five degrees are to be cut, thus requiring for one revolution of the wheel-blank thirty revolutions of the cutter, then in order to cause the cutter to travel over a wheel-blank twenty millimeters wide four revolutions of the screw-spindle are required, (its pitch being five millimeters,) whereby the slide $w$, carrying the cutter, will be shifted twenty millimeters; but at the same time the cutter is required to describe helical lines of forty-five-degrees pitch relatively to the wheel-blank. For this purpose the four revolutions of the screw-spindle $v$ are made to act in such manner upon the cutter through the wheels $y$ $z$ and the differential gear $i$ $k$ $n$ as to cause it to perform one revolution more, (or less.) This additional revolution is effected during the advance of the slide through twenty millimeters and during rotation through twenty millimeters of the wheel-blank. The resultant of these two separate motions of twenty millimeters each will produce the relative motion between cutter and wheel-blank at an inclination of forty-five degrees to the wheel-axis.

By the above-described method spiral worm-wheels with any desired number of teeth can be cut by means of one and the same spiral cutter. By this limitation to one cutting-tool the occurrence of faults is correspondingly limited to those existing in such tool. The work of cutting the teeth is rendered independent of the care and intelligence of the operatives, and it can be carried out rapidly and cheaply, as the manual manipulations are limited to the introduction of a fresh wheel-blank and the removal of the finished wheel.

Having now described the nature of my invention, what I desire to secure by Letters Patent of the United States is—

1. In means for cutting the teeth of spiral worm-wheels, the combination with means for imparting rotary motion to the wheel-blank and cutter, of means for imparting a differential resultant motion between said blank and cutter in the direction of a helical line passing around the axis of the wheel-blank.

2. In means for cutting the teeth of spiral worm-wheels, the combination with means for imparting rotary motion to the wheel-blank and cutter, of means for accelerating the motion of one part relatively to that of the other and for producing a differential resultant motion between the two parts in the direction of a helical line passing around the axis of the wheel-blank.

3. In apparatus for cutting the teeth of spiral worm-wheels by means of worm-cutters, the combination with means for imparting rotary motion to the wheel-blank and cutter, of means for imparting a relative motion between the two parts in the direction of a helical line passing around the axis of the wheel-blank, said means comprising a screw-spindle acting upon the spiral cutter for obtaining an advance thereof toward the wheel-blank, and differential gearing operating the spindle to effect an accelerated rotation of the cutter, substantially as described.

4. In apparatus for cutting the teeth of spiral worm-wheels by means of spiral cutters, the combination of a shaft $c$ imparting rotary motion to a shaft $h$ carrying the wheel-blank $b$, a shaft $q$ imparting rotary motion to the spiral cutter $a$ and receiving a differential motion from shaft $c$ through differential gear $i$ $k$ $n$ $o$ $p$ and screw-spindle $v$, a slide carrying a revoluble table on which is mounted the spiral cutter, and receiving rectilinear motion from the screw-spindle $v$, and bevel-gear $r$ $s$ transmitting the rotary motion of shaft $q$ to the spiral cutter, the shaft of said bevel-gear $r$ $s$ constituting the axis around which the said revoluble table can turn, so as to drive the cutter in whatever angular position it may be adjusted by the turning of the table, substantially as described.

In witness whereof I have hereunto set my hand in presence of two witnesses.

ROBERT HERMANN PFAUTER.

Witnesses:
J. C. MONAGHAN,
P. REUCHER.